(12) United States Patent
Yoo et al.

(10) Patent No.: US 8,717,176 B2
(45) Date of Patent: May 6, 2014

(54) REUSABLE 3D GLASSES EMBEDDED WITH RFID AND RF-EAS TAGS FOR USE AT 3D MOVIE THEATRES

(76) Inventors: Gene Yoo, Irvine, CA (US); Kiwon Yoo, Los Angeles, CA (US)

( * ) Notice: Subject to any disclaimer, the term of this patent is extended or adjusted under 35 U.S.C. 154(b) by 340 days.

(21) Appl. No.: 13/158,242

(22) Filed: Jun. 10, 2011

(65) Prior Publication Data

US 2011/0304462 A1 Dec. 15, 2011

Related U.S. Application Data

(60) Provisional application No. 61/354,216, filed on Jun. 13, 2010.

(51) Int. Cl.
*G08B 13/14* (2006.01)

(52) U.S. Cl.
USPC .................. 340/572.8; 340/693.5; 705/28

(58) Field of Classification Search
USPC ......... 340/572.1, 572.8, 693.5, 5.8, 5.92, 5.2, 340/5.3, 10.1; 705/28, 22; 235/385
See application file for complete search history.

(56) References Cited

U.S. PATENT DOCUMENTS

| | | | |
|---|---|---|---|
| 2008/0151370 A1* | 6/2008 | Cook et al. | 359/464 |
| 2013/0001306 A1* | 1/2013 | Healy et al. | 235/385 |

* cited by examiner

*Primary Examiner* — Thomas Mullen
(74) *Attorney, Agent, or Firm* — John L. Park; Park Law Firm

(57) ABSTRACT

Reusable 3D glasses are provided, comprising temples embedded with RFID chips, a detachable lens portion, and a curved bridge portion. The RFID chips are to be used with a tracking system that performs a plurality of functions of: monitoring available inventory levels; counting the number of 3D glasses used by patrons; preventing unauthorized use of 3D glasses; preventing theft of 3D glasses; and counting the number of re-uses per pair of glasses. The tracking system further comprises a plurality of boxes for storing reusable 3D glasses; each box may comprise one or more RFID chips affixed along a cutting line on the box and one or more RFID chips inside the boxes. The curved bridge portion is configured for a user to comfortably wear 3D glasses over prescription glasses. The detachable lens frame is configured for salvaging a usable part in case of partial damage of the reusable 3D glasses.

7 Claims, 7 Drawing Sheets

REUSABLE 3D GLASSES EMBEDDED WITH RFID AND RF-EAS TAGS FOR USE AT 3D MOVIE THEATRES

RELATED APPLICATION

This application is a Non-provisional application of the provisional patent Application No. 61/354,216 for "Reusable 3D Glasses Embedded with RFID and RF-EAS tags for use at 3D movie theatres" filed on Jun. 13, 2010.

BACKGROUND OF THE INVENTION

The present invention relates to reusable 3D glasses embedded with RFID and RF-EAS tags for use at 3D movie theatres.

A need for reusable 3D glasses has soared due to the recent expansive demands in theatres, high cost and poor quality of disposable 3D glasses, and the environmental concerns over disposable 3D glasses. This invention is directed to solve problems associated with adopting reusable 3D glasses, such as tracking inventory and usage counts, as well as monitoring and controlling shrinkage and theft.

SUMMARY OF THE INVENTION

The present invention contrives to solve the disadvantages of the prior art.

An object of the invention is to provide reusable 3D glasses embedded with RFID and RF-EAS tags.

An aspect of the invention provides reusable 3D glasses comprising a detachable lens portion, a pair of temples, a curved bridge portion, and one or more RFID chips and RF-EAS tags.

The detachable lens portion has left and right lenses connected at a junction.

The curved bridge portion has a left bridge, a right bridge, and a joint where the left and right bridges are connected to each other. Each of the left and right bridges is curved upward and rearward from the joint so as to follow the contour of a face of user in general, and the curved bridge portion is detachably connected to the detachable lens portion at the junction and the joint, and connected to the pair of temples at outer ends of the left and right bridges respectively, such that two wedge-shaped gaps are formed on both sides of the engaging point between the junction and the joint.

The one or more RFID chips are embedded in the pair of temples or in the lens frame.

The curved bridge portion and the two wedge-shaped gaps may be configured to facilitate a user to wear the reusable glasses over a pair of prescription glasses.

The two wedge-shaped gaps may be configured to accept a part of another pair of reusable 3D glasses for facilitating stacking of a plurality of reusable 3D glasses.

The detachable lens portion may further comprise a lens frame enclosing the left and right lenses, and the junction may be disposed at a central point of the lens frame.

The one or more RFID chips may be installed in the pair of temples or lens frame hermetically.

The reusable 3D glasses may further comprise one or more RF-EAS tags embedded in the pair of temples hermetically.

The reusable 3D glasses may further comprise a mechanical fastener configured to fasten the detachable lens portion to the curved bridge portion.

The mechanical fastener may comprise a screw configured to penetrate and engage the detachable lens portion through a hole provided at the joint of the curved bridge portion.

Each of the one or more RFID may comprise a passive RFID.

Another aspect of the invention provides a tracking system for reusable 3D glasses.

The tracking system comprises a plurality of reusable 3D glasses, one or more mobile interrogators, one or more fixed interrogators, one or more alarm signaling systems, a plurality of boxes to store a plurality of 3D glasses, and a system server.

The plurality of reusable 3D glasses is the same reusable 3D glasses described in the above.

The one or more mobile and fixed interrogators are for authenticating the reusable 3D glasses upon receipt from cleaning centers or warehouses.

The one or more fixed interrogators are installed at movie screen entrances for admitting authenticated 3D glasses only and counting the number of patrons with 3D glasses.

The alarm signaling system is for providing an alarm when unauthenticated 3D glasses enter into the screen through the fixed interrogators.

The system server is connected electronically to the mobile and fixed interrogators and the alarm signaling system, and is configured to process information collected from the mobile and fixed interrogators using a RFID system database.

The system server, with one or more mobile and fixed interrogators, may be configured to perform a plurality of functions of: counting the number of 3D glasses received; authenticating the reusable 3D glasses before patrons use, counting the number of reusable 3D glasses used by patrons per movie title, per showing time and per screen; preventing entry of unauthenticated reusable 3D glasses into 3D screens; preventing theft of reusable 3D glasses from theatres; counting the number of 3D glasses collected after usage, shipped for cleaning, cleaned on-site or off-site, and remaining at the storage area; and counting the number of re-uses per pair of reusable 3D glasses as a proxy for degradation.

An authenticated pair of reusable 3D glasses may pass through the fixed interrogators without sounding an alarm.

The tracking system may further comprise one or more fixed RF-EAS gates installed at theatre exits, and the alarm signaling system may issue an alarm when one of the plurality of reusable 3D glasses is removed from the theatre through the fixed RF-EAS gates.

moment.

The tracking system may further comprise a plurality of boxes for storing the plurality of reusable 3D glasses, and each of the boxes may comprise one or more cuttable RFID chips affixed along a cutting line provided on the box, as well as one or more additional RFID chips affixed to the inner walls of the boxes.

The cuttable RFID chips may be configured to be cut and disabled when the box is opened.

The system server may maintain and process the relationship between information read from the cuttable RFID chips on the box, any additional RFID chips on the inner walls of the box, and the one or more RFID chips in the plurality of reusable 3D glasses in the box.

The tracking system may be configured for: tracking the usage of reusable 3D glasses including the number of reusable 3D glasses which are newly received, used by customers, collected after usage, shipped for cleaning, cleaned on-site or off-site, and received after cleaning and refurbishment using the fixed and mobile interrogators throughout the theatre and one or more cleaning centers located inside or outside the theatre; preventing theft of reusable 3D glasses using the fixed interrogators and the alarm signaling system(s); authenticating usable inventory and preventing unauthenticated usage using the interrogators and the alarm signaling system(s); tracking usage count and wash count for estimating degradation of reusable 3D glasses; and further tracking usable inventory levels by counting the boxes with the cuttable RFID chips.

The system server may be configured to obtain a daily aggregate usage count by calculating; total beginning inventory+received inventory during day−remaining inventory of at end of day.

The system server may be configured to estimate shrinkage of the inventory level by calculating; the usage count−collected reusable 3D glasses.

The advantages of the present invention are: (1) usage of reusable 3D glasses can be counted in aggregate as well as per pair of 3D glasses; (2) shrinkage of 3D glasses can be monitored and controlled; (3) unauthorized usage of 3D glasses can be curtailed; (4) the reusable 3D glasses can be stacked compactly; (5) reusable 3D glasses can be used over a standard pair of prescription glasses; and (6) and proper on-site inventory level can be maintained by a remote tracking system.

Although the present invention is briefly summarized, the fuller understanding of the invention can be obtained by the following drawings, detailed description and appended claims.

BRIEF DESCRIPTION OF THE DRAWINGS

These and other features, aspects and advantages of the present invention will become better understood with reference to the accompanying drawings, wherein.

DETAILED DESCRIPTION EMBODIMENTS OF THE INVENTION

U.S. Provisional Application No. 61/354,216 was filed on Jun. 13, 2010 for an invention entitled "Reusable 3D Glasses Embedded with RFID and RF-EAS tags for use at 3D movie theatres." The disclosures of the application are incorporated by reference as if fully set forth herein.

Figure 1:
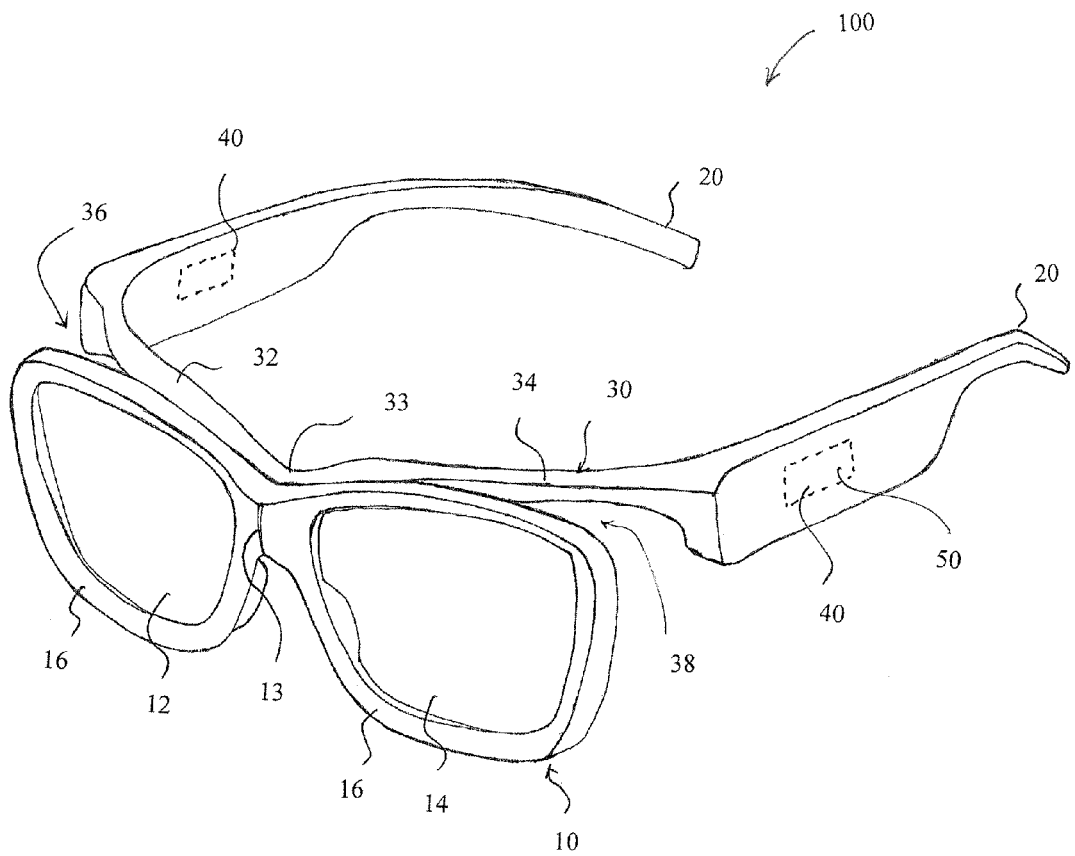
FIG. 1 is a perspective view showing a pair of reusable 3D glasses according to an embodiment of the present invention.
Figure 2:
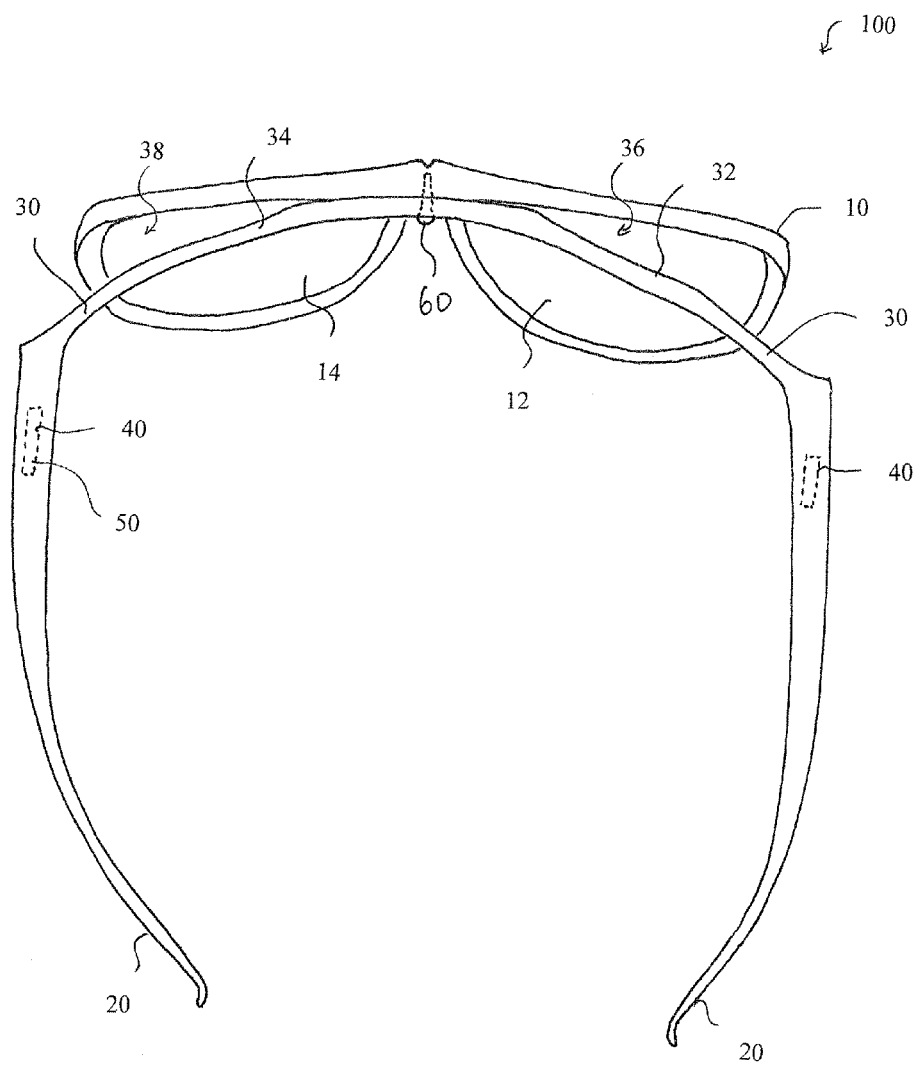
FIG. 2 is an elevated top view showing the reusable 3D glasses of FIG. 1.

FIGS. 1 and 2 show a pair of reusable 3D glasses according to an embodiment of the present invention.

An aspect of the invention provides reusable 3D glasses 100 comprising a detachable lens portion 10, a pair of temples 20, a curved bridge portion 30, and one or more RFID chips 40.

The detachable lens portion 10 has left and right lenses 12, 14 connected at a junction 13.

The curved bridge portion 30 has a left bridge 32, a right bridge 34, and a joint 33 where the left and right bridges 32, 34 are connected to each other. Each of the left and right bridges 32, 34 is curved upward and rearward from the joint 33 so as to follow the contour of a face of user, and the curved bridge portion 30 is detachably connected to the detachable lens portion 10 at the junction 13 and the joint 33 and connected to the pair of temples 20 at outer ends of the left and right bridges 32, 34 respectively, such that two wedge-shaped gaps 36, 38 are formed on both sides of the engaging point between the junction 13 and the joint 33.

The one or more RFID chips 40 are embedded in the pair of temples 20 or in the lens frame as shown in FIGS. 1 and 2.

The curved bridge portion 30 and the two wedge-shaped gaps 36, 38 may be configured to facilitate a user to wear the reusable 3D glasses 100 over a pair of prescription glasses (not shown) that the user wears.

The two wedge-shaped gaps 36, 38 may be configured to accept a part of another pair of reusable 3D glasses 100 for facilitating stacking of a plurality of reusable 3D glasses 100.

The detachable lens portion 10 may further comprise a lens frame 16 enclosing the left and right lenses 12, 14, and the junction 13 may be disposed at a central point of the lens frame 16.

The one or more RFID chips 40 may be installed in the pair of temples 20 or in the lens frame hermetically, such that a plurality of cleaning processes do not affect the functionality of the RFID chips 40.

The reusable 3D glasses 100 may further comprise one or more RF-EAS tags 50 embedded in the pair of temples 20, and the one or more RF-EAS tags 50 may be installed in the pair of temples 20 hermetically.

The reusable 3D glasses 100 may further comprise a mechanical fastener 60 configured to fasten the detachable lens portion 10 to the curved bridge portion 30.

The mechanical fastener 60 may comprise a screw configured to penetrate and engage the detachable lens portion 10 through a hole provided at the joint 33 of the curved bridge portion 30.

Each of the one or more RFID chips may comprise a passive RFID chip.

Another aspect of the invention provides a tracking system for reusable 3D. FIGS. 3-6 show a tracking system 200 according to another embodiment of the present invention.

Figure 3:
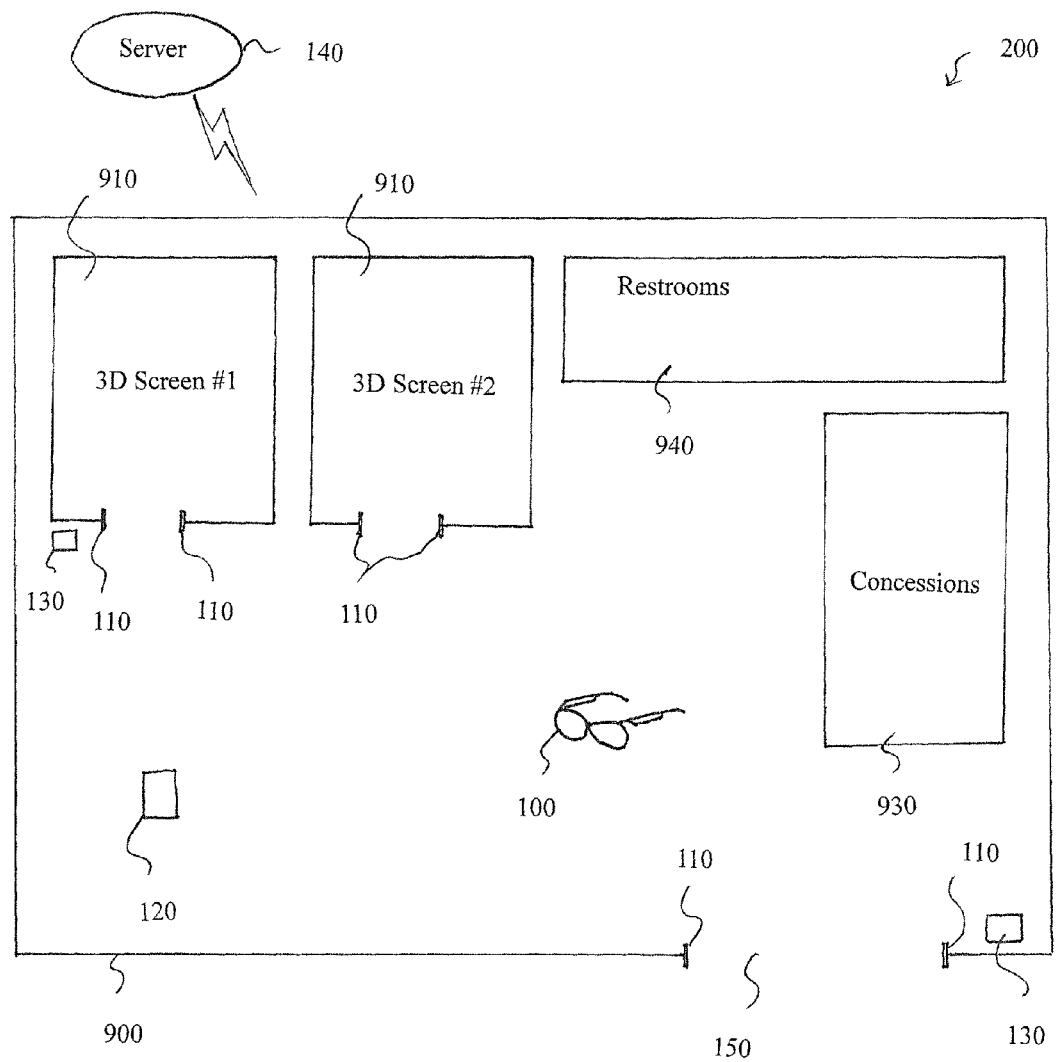
FIG. 3 is a top plan view of a theatre area showing a tracking system according to another embodiment of the present invention.
Figure 4:
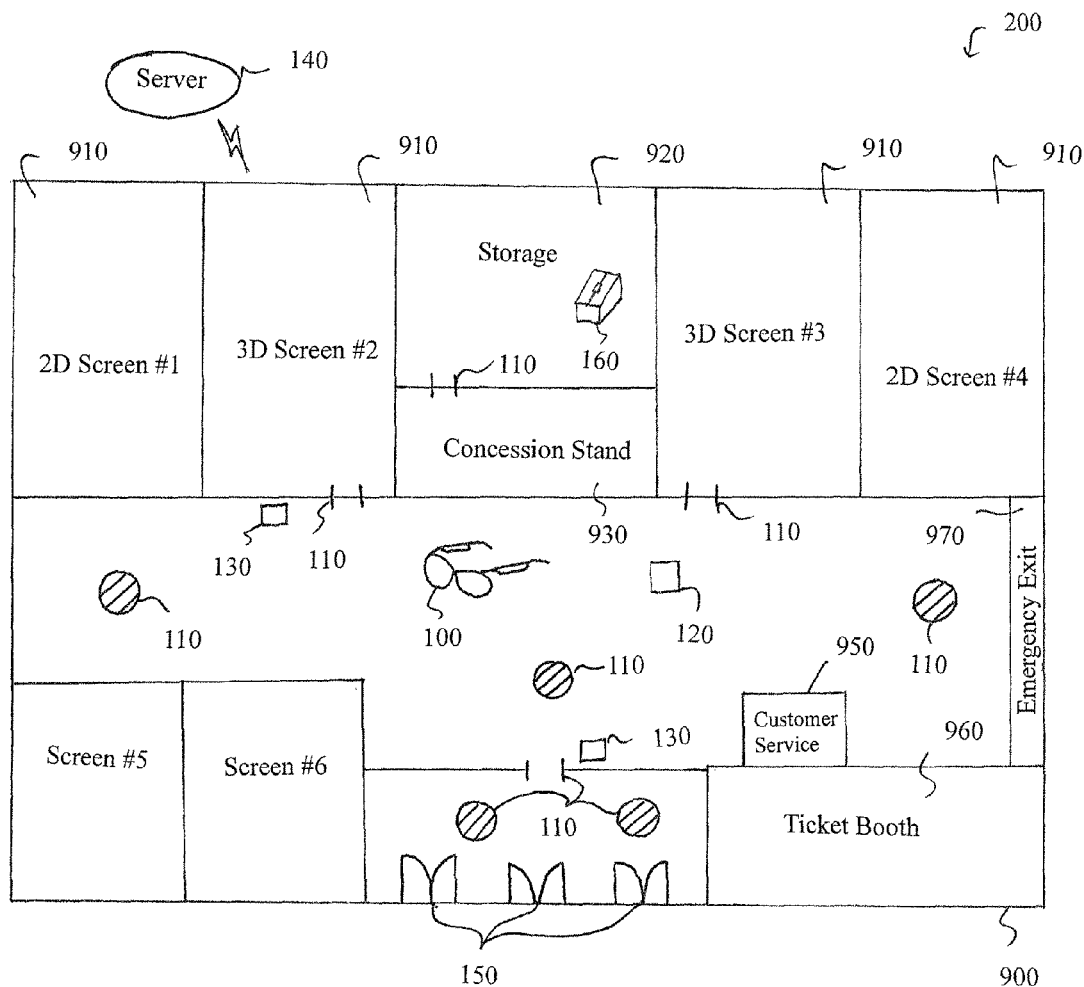
FIG. 4 is a top plan view of a theatre area showing a tracking system according to still another embodiment of the present invention.
Figure 5:
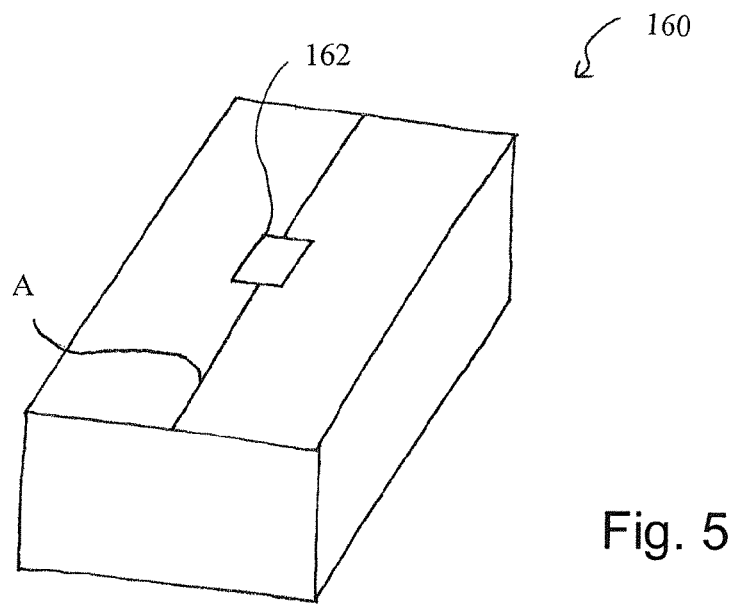
FIG. 5 is a perspective view showing a box affixed with a cuttable RFID chips or bar-codes according to still another embodiment of the present invention.
Figure 6:
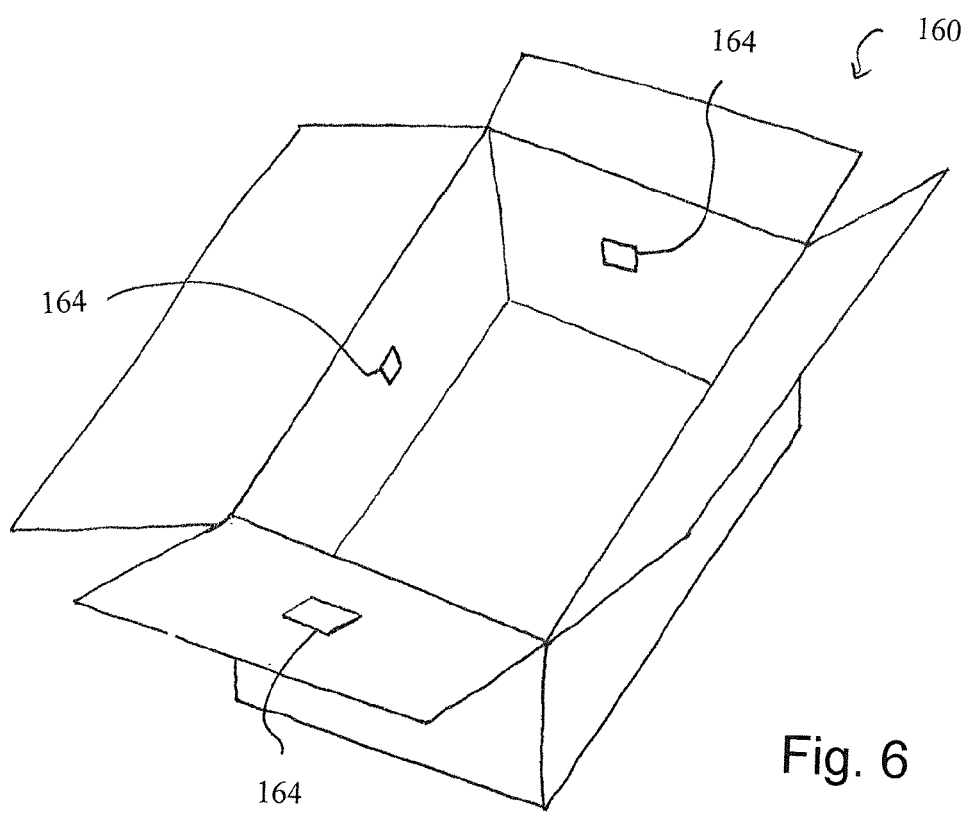
FIG. 6 is a perspective view showing a box affixed with cuttable RFID chips or bar-codes and box RFID chips according to still another embodiment of the present invention.

The tracking system 200 comprises a plurality of reusable 3D glasses 100, one or more mobile interrogators 120, one or more fixed interrogators 110, an alarm signaling system 130, and a system server 140 as shown in FIGS. 3 and 4.

The plurality of reusable 3D glasses 100 are the same reusable 3D glasses described in the above embodiments.

The one or more mobile interrogators 120 or the one or more fixed interrogators 110 are for authenticating reusable 3D glasses 100.

The one or more fixed interrogators 110 are installed at movie screen entrances for admitting authenticated 3D glasses 100 only and counting the number of patrons with 3D glasses 100.

The alarm signaling system 130 is for providing an alarm when unauthenticated 3D glasses 100 enter into the screen area in the theatre through the fixed interrogators 110. The location of the alarm signaling system 130 may be, but not limited to, close to the fixed interrogators 110. The alarm signaling system 130 may be muted if necessary.

The system server 140 is connected electronically to the mobile and fixed interrogators 110, 120 and the alarm signaling system 130, and can be configured to process information collected from the mobile and fixed interrogators 110, 120 using a RFID system database, which may be a part of the system server 140. In certain embodiments, the RFID system database may be disposed in a location away from the server 140.

Authentication of the reusable 3D glasses 100 may be performed prior to use by patrons.

An authenticated pair of reusable 3D glasses 100 may pass through the fixed interrogators 110 without sounding an alarm.

The tracking system 200 may further comprise one or more fixed RF-EAS gates 150 installed at theatre exits, and the alarm signaling system 130 may issue an alarm when one of the plurality of reusable 3D glasses 100 is removed from the theatre 900 through the fixed RF-EAS gates 150. The number and location of the fixed RF-EAS gates 150 may be determined according to the structure and layout of the theatre 900.

The system server 140 may collect and maintain: the number of reusable 3D glasses 100 utilized by patrons, as indicated by the number of glasses that enter the screen areas 910 past the fixed interrogators 110, by movie title and by showing time; the number of re-uses per pair of reusable 3D glasses 100 as an indication for degradation; and the number of reusable 3D glasses 100 in circulation at the theatre 900 at a predetermined moment.

The tracking system 200 may further comprise a plurality of boxes 160 for storing the plurality of reusable 3D glasses 100, and each of the boxes 160 may comprise one or more cuttable RFID chips or bar-codes 162 affixed along a cutting line A provided on the box 160, as well as one or more RFID chips or bar-codes 162 affixed to the inner walls of the box 160.

The cuttable RFID chips or bar-codes 162 may be configured to be cut and disabled when the box 160 is opened.

The system server 140 may maintain and process the relationship between information read from the cuttable RFID chips or bar-codes 162 on the box 160 as well as one or more RFID chips or bar-codes 162 affixed to the inner walls of the box 160, and the one or more RFID chips 40 in the plurality of reusable 3D glasses 100 in the box 160.

The tracking system 200 may be configured for: tracking the usage of the reusable 3D glasses 100 including the number of reusable 3D glasses 100 which are newly received, used by customers, collected after usage, shipped for cleaning, cleaned on-site or off-site, and received after cleaning and refurbishment using the fixed and mobile interrogators 110, 120 throughout the theatre 900 and one or more cleaning centers 180 located inside or outside the theatre 900; preventing theft of the reusable 3D glasses 100 using the fixed interrogators 110 and the alarm signaling system 130; authenticating usable inventory and preventing unauthenticated usage using the interrogators 110, 120 and the alarm signaling system 130; tracking usage, wash count, or usage and wash count for estimating degradation of the reusable 3D glasses 100; and tracking usable inventory level by counting the boxes 160 with the cuttable RFID chips or bar-codes 162.

One or more RFID chips 164 affixed to the inner walls of the box 160 may have an ID which is distinct from that of the cuttable RFID chips or bar-codes 162. The boxes 160 may be tracked even after the cuttable RFID chips or bar-codes 162 were cut and disabled utilizing box RFID chips 164. Also, the box RFID chips 164 may increase the chances of detection even when many boxes 160 are stacked on top of one another, thus blocking the cuttable RFID chips or bar-codes 162.

The system server 140 may be configured to obtain a usage count by calculating: total beginning inventory+received inventory during day−remaining inventory of at end of day.

The system server 140 may be configured to estimate shrinkage of the inventory level by calculating: the usage count−collected reusable 3D glasses.

Figure 8:
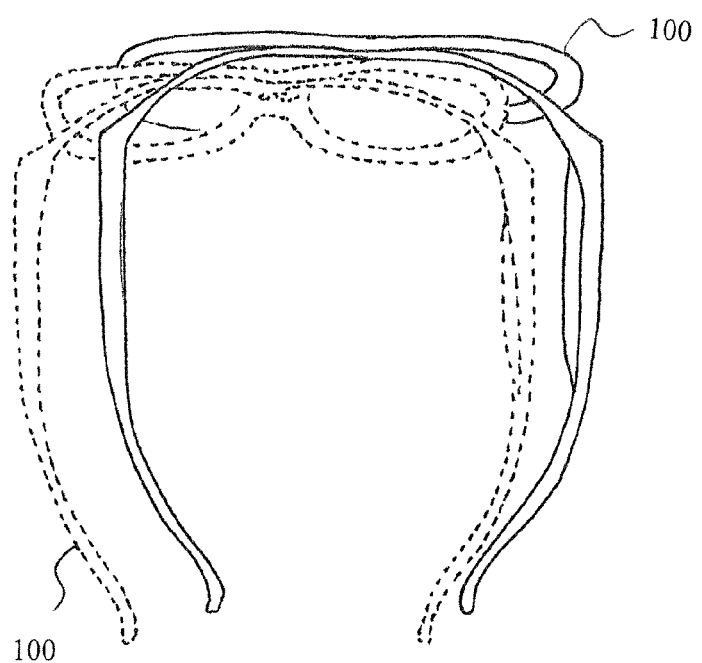
FIG. 8 is a top perspective view showing a pair of reusable 3D glasses stacked on another pair of reusable 3D glasses.

FIG. 8 shows a top perspective view of a pair of reusable 3D glasses stacked on another pair of reusable 3D glasses. Stackability of the reusable 3D glasses 100 is facilitated by the structure of the detachable lens portion 10 and the curved bridge portion 30.

In FIGS. 3 and 4, the theatre 900 may further include concession stands 930, restrooms 940, a customer service desk 950, a ticket booth 960, and an emergency exit 970. In certain embodiments of the invention, additional mobile or fixed interrogators 110, 120 may be installed around such facilities.

The fixed interrogators 110 may include one or more antennas. Some of the fixed interrogators 110 may be installed on elevated locations such as ceiling to detect approximate location of the glasses 100 as described by hatched circles.

Figure 7:
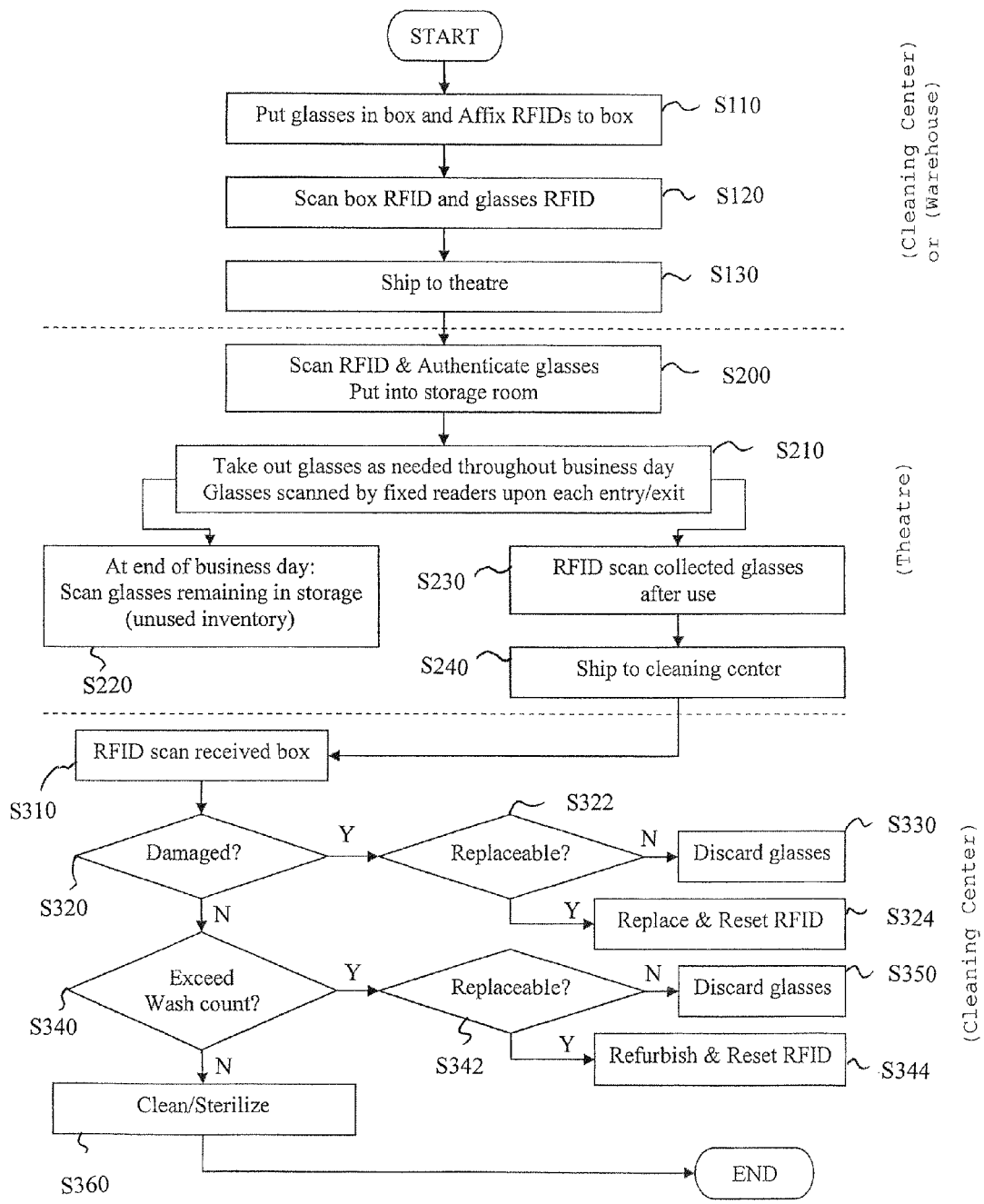
FIG. 7 is a flowchart showing the tracking system for monitoring the inventory levels, usage, and shrinkage of the reusable 3D glasses according to still another embodiment of the present invention.

In Step S110 (FIG. 7), the reusable 3D glasses 100 are put in the box 160 and one or more cuttable RFIDs or bar-codes 162 as well as box RFID chips 164 are affixed to the box 160. The number and location of the cuttable RFID chips bar-codes 162 and box RFID chips 164 may be determined to maximize detecting of the RFID chips 162, 164.

In Step S120, the RFID chips in the box 160 and the glasses 110 are scanned.

In Step S130, the reusable 3D glasses 100 in the box 160 are shipped to the theatre 900.

In Step S200, the reusable 3D glasses 100 in the box 160 are scanned and authenticated, and put into the storage room 920.

In Step S210, the glasses 100 are taken out from the box 160 as needed throughout the business day, and scanned by fixed readers or interrogators 110 upon each entry and exit.

In Step S220, at end of the business day, the glasses 100 are scanned, which remain in the storage 920, and are treated as unused inventory.

In Step S230, the collected glasses are scanned after use, and then shipped to the cleaning center 180 in Step S240.

In Step S310, the received boxes 160 are scanned to check for damage.

Since the reusable 3D glasses 100 include two major portions, the detachable lens portion 10 and the remaining part, either one which is damaged may be replaced with a new one.

In Step S320 and S322, if damaged and irreplaceable, the reusable 3D glasses are discarded as in Step S330. If damaged but replaceable, the broken portion is replaced with a new one and the RFIDs are reset as shown in Step S324.

In Step S340, it is checked if the glasses have been washed a predetermined number of times. If this number exceeds the wash count or is deemed irreplaceable in Step S342, then they are discarded as in Step S350. However, if the reusable 3D glasses exceed the number of wash counts but are replaceable, they are refurbished and the RFIDs are reset for subsequent usage as shown in Step S344.

In Step S360, used 3D glasses are cleaned and sterilized for subsequent usage.

The Steps from S110 to S130 take place in the cleaning center 180 or a warehouse (not shown).

The Steps from S200 to S240 take place in the theatre 900.

The Steps from S310 to S360 take place in a cleaning center 180.

While the invention has been shown and described with reference to different embodiments thereof, it will be appreciated by those skilled in the art that variations in form, detail, compositions and operation may be made without departing from the spirit and scope of the invention as defined by the accompanying claims.

What is claimed is:

1. A pair of reusable 3D glasses comprising:
    a detachable lens portion having left and right lenses connected at a junction;
    a pair of temples;
    a curved bridge portion having a left bridge, a right bridge, and a joint where the left and right bridges are connected to each other, wherein each of the left and right bridges is curved upward and rearward from the joint so as to follow a contour of a face of a user, wherein the curved bridge portion is detachably connected to the detachable lens portion at the junction and the joint and connected to the pair of temples at outer ends of the left and right bridges respectively, such that two wedge-shaped gaps are formed on both sides of an engaging point between the junction and the joint; and
    one or more RFID chips embedded in the pair of temples or in the lens frame.

2. The reusable 3D glasses of claim 1,
    wherein the one or more RFID chips are installed in the pair of temples or in the lens frame hermetically.

3. The reusable 3D glasses of claim 1, wherein the detachable lens portion further comprises a lens frame enclosing the left and right lenses, and wherein the junction is disposed at a central point of the lens frame.

4. The reusable 3D glasses of claim 1, wherein the curved bridge portion and the two wedge-shaped gaps are configured to facilitate a user to wear the reusable glasses over a pair of prescription glasses.

5. The reusable 3D glasses of claim 1, further comprising one or more RF-EAS tags embedded in the pair of temples, wherein the one or more RF-EAS tags are installed in the pair of temples hermetically.

6. The reusable 3D glasses of claim 1, further comprising a mechanical fastener configured to fasten the detachable lens portion to the curved bridge portion.

7. The reusable 3D glasses of claim 6, wherein the mechanical fastener comprises a screw configured to penetrate and engage the detachable lens portion through a hole provided at the joint of the curved bridge portion and in the engaging point.

* * * * *